July 9, 1968  R. J. LOHR ET AL  3,391,489
MOTOR SIMULATOR AND HORN UNIT
Filed March 30, 1966  2 Sheets-Sheet 1
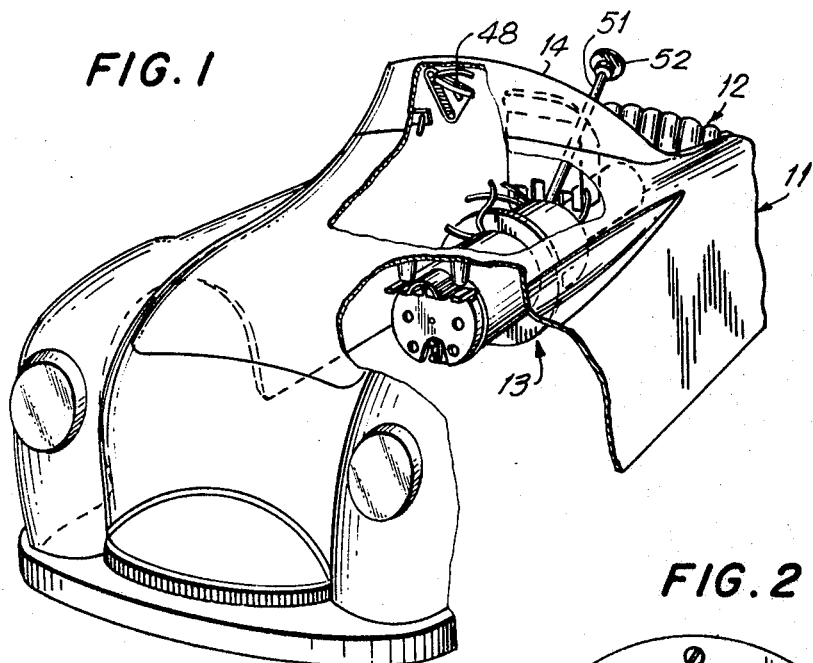
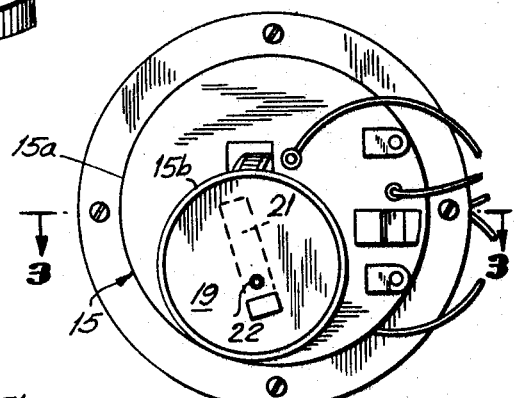
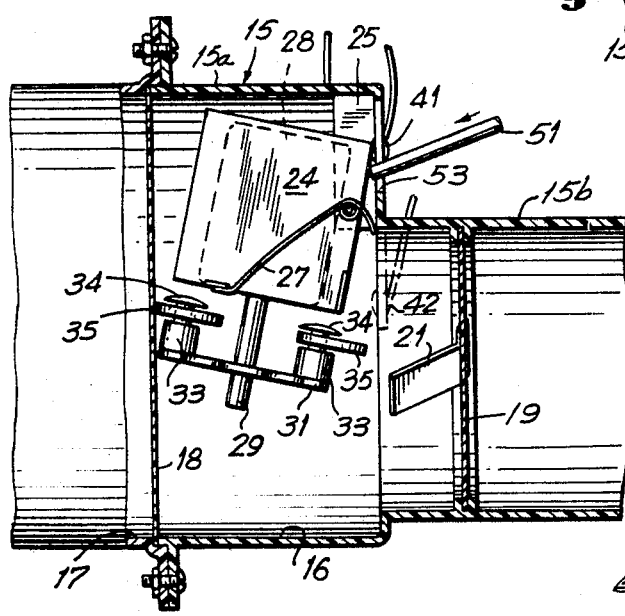
INVENTORS
RAYMOND J. LOHR
RICHARD N. CARVER
JAMES SMITH
ATTORNEYS July 9, 1968   R. J. LOHR ET AL   3,391,489
MOTOR SIMULATOR AND HORN UNIT
Filed March 30, 1966   2 Sheets-Sheet 2

INVENTORS
RAYMOND J. LOHR
RICHARD N. CARVER
JAMES SMITH
ATTORNEYS 3,391,489
MOTOR SIMULATOR AND HORN UNIT
Raymond J. Lohr, Richard N. Carver, and James Smith, Erie, Pa., assignors to Louis Marx & Co., Inc., a corporation of New York
Filed Mar. 30, 1966, Ser. No. 538,829
8 Claims. (Cl. 46—232)

This invention relates generally to a motor simulator and horn unit especially adapted for mounting in a toy vehicle for electrically powering, through a single electric motor and energy source a realistic sounding horn and a noise-making device which simulates the sound produced by an internal combustion engine. The horn sound generating portion and the motor simulator sound generating portion may be selectively actuated in the alternative.

It is therefore a principal object of the invention to provide a motor simulator and horn unit which may be selectively actuated from a single drive motor.

Another object of the invention is to provide a combined vibration producing element capable of generating a horn sound as well as a sound simulating that of an internal combustion engine.

Still other objects and advantage of the invention will in part be obvious and will in part be apparent from the specification.

Generally speaking, in accordance with this invention, a motor mounted on a pivoted frame is located between a motor sound simulating diaphragm and a horn sounding diaphragm. The motor shaft carries striking elements adapted to selectively vibrate the diaphragms with the striking elements being movable proximate to the diaphragms by selective pivoting of the motor carrying frame. A suitable electric circuit is provided for control of the motor in its selected positions.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 1 is a partial, broken-away perspective view of a toy vehicle having a motor simulator and horn unit constructed in accordance with a preferred embodiment of the invention mounted therein;

FIG. 2 is an end elevational view of the motor simulator and horn unit shown in FIG. 1;

FIG. 3 is a partial sectional view taken along line 3—3 of FIG. 2, with the motor assembly being shown in its normal position;

Figure 4:
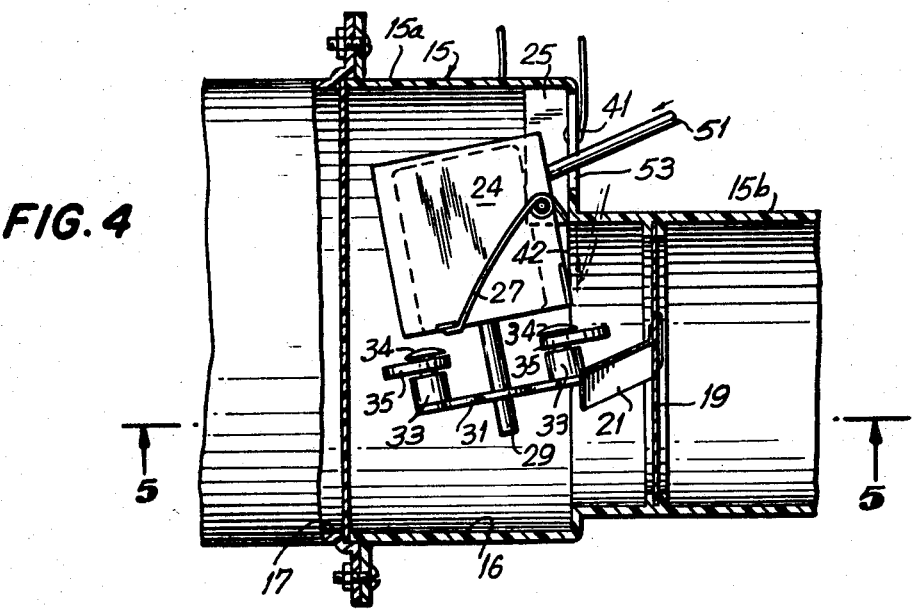
FIG. 4 is a view similar to FIG. 3 showing the motor assembly in an alternate position.

Referring now to FIG. 1, a toy vehicle 11 having a passenger compartment 12 in which a child may sit has mounted therein a motor simulator and horn unit 13 operated through controls carried by the toy vehicle dashboard 14 and accessible from the passenger compartment.

Referring to FIGS. 2 through 5, the motor simulator and horn unit 13 is formed with a housing 15 which may be molded of a plastic material and which includes a section of larger diameter 15a and a section of smaller diameter 15b. The section of larger diameter includes a motor compartment 16 and a battery compartment 17 between which is mounted a diaphragm 18 of suitable fiber material. The free diameter of diaphragm 18 is substantially equal to the inside diameter of housing 15a. Battery compartment 17 is provided for carrying the usual type of flashlight batteries (not shown) for providing electrical energy for the motor. Since the battery compartment forms no part of the instant invention, a further description thereof is deemed unnecessary. Furthermore, the batteries can be remotely mounted, if desired.

Housing portion 15b carries a diaphragm 19 of suitable fiber material with diaphragms 18 and 19 being juxtaposed in substantially parallel relationship. A spring finger 21 is suitably secured to diaphragm 19 to effect vibration of the diaphragm in response to vibration of the spring finger. In the embodiment shown, one end of spring finger 21 extends through a slit in diaphragm 19 with a rivet 22 securing the spring finger to the diaphragm.

A metallic frame 24 is pivoted within motor compartment 16 by means of brackets 25 and a pivot shaft 26. A spring 27 surrounds the pivot shaft and acts between frame 24 and housing 15 to bias the frame in a clockwise direction to its "normal position" as shown in FIG. 3. Supported on frame 24 is an electric motor 28 having a motor shaft 29 extending therefrom.

Figure 5:
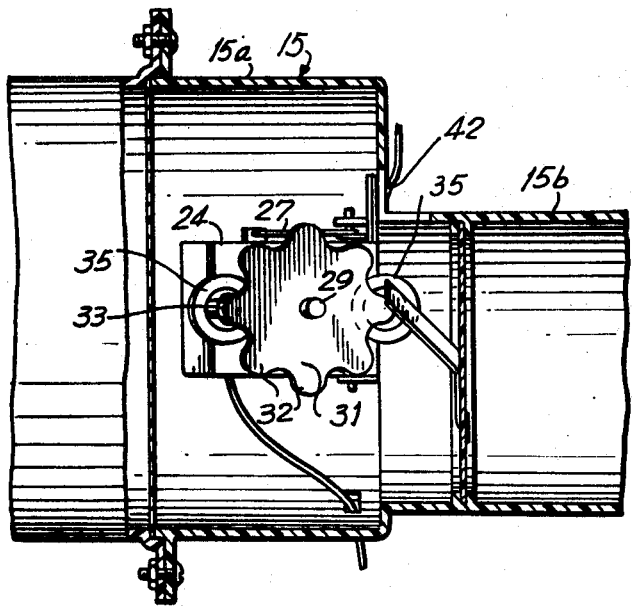
FIG. 5 is a partial sectional view taken along line 5—5 of FIG. 4.

A plate 31 is mounted fast on motor shaft 29 and, as best shown in FIG. 5, is provided with a plurality of circumferentially spaced cam-shaped lobes 32. Plate 31 also carries a pair of diametrically opposed bushings 33 each receiving a headed pin 34 to loosely mount a washer 35 whose inside diameter is larger than the outside diameter of the shank of pin 34 so that each washer 35 can freely rotate about and move laterally with respect to its associated headed pin 34. Plate 31, under the driving action of motor 28, rotates in a plane perpendicular to the axis of the motor shaft. Washers 35 are caused to rotate in a parallel plane spaced from the plane of plate 31 by means of bushings 33.

As shown in FIG. 3 with frame 24 biased to its normal position, the plane of rotation of washers 35 passes substantially through the center of large diaphragm 18 so that, as the washers are rotated about motor shaft 29, they will be caused to move outwardly from the center of rotation and will impinge on or strike the diaphragm to generate a sharp sound. Because of the size of the diaphragm and as a result of suitable selection of diaphragm material, the sound produced will be of a relatively low frequency in order to simulate the sound of an internal combustion engine. As the washers strike the diaphragm, the washers will be deflected as a result of their loose mounting on pins 34 so as to minimize the stresses cyclically applied to the diaphragm.

When frame 24 is rotated against the action of spring 27, it moves to the position shown in FIGS. 4 and 5. In this position, washers 35 are out of the range of contact with diaphragm 18 and the periphery of plate 31 is brought into contact with spring finger 21. As plate 31 is rotated through the motor, spring finger 21 is cyclically deflected to thereby vibrate small diaphragm 19. The smaller size of the diaphragm results in the generation of a noise of high frequency which, when coupled with the substantial number of impacts per revolution effects the generation of a loud noise of relatively high pitch so that a substantially continuous "horn" sound is produced. With a single motor having a predetermined maximum r.p.m., the substantial difference in sounds produced by the two diaphragms primarily results from the multiplication factor of impacts per revolution. This may be readily understood by noting that the two washers 35 provide for merely two impacts on diaphragm 18 for each revolution of shaft 29 while the multiple lobes 32 on plate 31 provide for, in the example shown, eight impacts on or deflections of spring finger 21 for each revolution of shaft 29. Thus with a single motor and striking element assembly, sounds having widely divergent characteristics will result.

Figure 6:
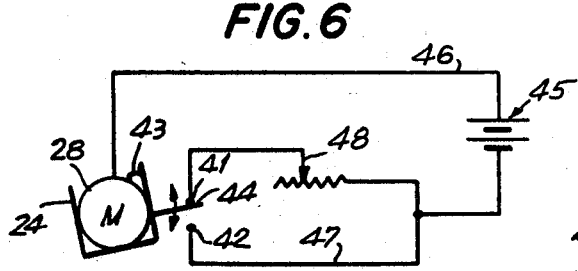
FIG. 6 is a schematic diagram of an electrical circuit for controlling the operation of the motor simulator and horn unit.

The circuitry for operation of the motor simulator and horn unit may best be described in connection with FIGS. 3 and 6. Housing 15, which is preferably formed of an insulating material, carries a pair of electrical contacts 41 and 42 which are positioned for selective engagement with metallic frame 24. The frame is electrically connected to one of the terminals of motor 28 through a conductor 43 and the metallic frame is thereby used as part of the electrical circuit and to act as a switch schematically indicated at 44 in FIG. 6. It will be understood that frame 24 could be formed of a non-conductive material whereupon additional conductors and contacting members would be supplied.

The other pole of motor 28 is connected directly to one side of the source of potential or battery 45 through a conductor 46. The other side of the battery includes parallel circuits for connections to contacts 41 and 42. Contact 42 is directly connected to said other side of the battery through a conductor 47 while contact 41 is connected in parallel with conductor 47 through a rheostat 48. As shown in FIG. 3, metallic frame 24 is normally biased, through spring 27, into engagement with contact 41 and thus a circuit through rheostat 48 is normally closed. The normal position is with washers 35 proximate to diaphragm 18 and thus on-off and variable speed control may be accomplished through the rheostat to generate sounds simulating that of an internal combustion engine. Rheostat 48 is also shown as being mounted on dashboard 14 in FIG. 1.

Also depicted as extending through dashboard 14 is a push rod 51 having a knob 52 at its outer end. The push rod is slideably mounted through the dashboard by any suitable means with its lower end extending through an aperture 53 in housing 15 and into engagement with frame 24. When the child depresses knob 52, push rod 51 is advanced against frame 24 to rotate it against the action of spring 27 to the position shown in FIG. 4. In such position, the lobes on plate 31 are proximate to spring finger 21 to generate the horn sound on rotation of the plate. Rotation is effected by simultaneous engagement of metallic frame 24 with contact 42 which, as shown in the circuit diagram, completes a circuit from the battery to the motor for application of full load current across the motor. In other words, the circuit through the rheostat is broken on movement of the striking elements to the horn sounding position whereby the motor rotates at full r.p.m. On release of knob 52, frame 24 returns to its normal position to thereby place the circuit under control of rheostat 48. To recapitulate, the depression of push rod 51 has the dual effect of completing a parallel circuit through the motor and moving the striker elements toward diaphragm 19 for operation of the horn portion of the motor simulator and horn unit.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A sound producing unit comprising a housing, a pair of sounding boards carried by said housing in spaced relation, one to the other, sound generating means, means mounting said sound generating means within said housing between said sounding boards, means biasing said sound generating means toward one of said sounding boards and control means for selectively moving said sound generating means toward the other of said sounding boards.

2. A sound producing unit as claimed in claim 1, wherein said sound generating means includes a rotatable plate having a plurality of lobes spaced about the periphery thereof, at least one pin affixed to said plate and extending perpendicularly therefrom, and a washer loosely mounted about each of said pins, the number of lobes on said plate being substantially greater than the number of washers.

3. A sound producing unit as claimed in claim 2, wherein said washers and said plate lie in parallel planes, said washers adapted to strike said one of said sounding boards, said other sounding board including a spring finger secured thereto, said lobes adapted to strike said spring finger when said sound generating means is moved by said control means.

4. A sound producing unit as claimed in claim 1, wherein said sound generating means includes a frame, at least a portion of said frame being electrically conductive, a motor mounted in said frame and connected to said conductive portion, an energy source for driving said motor, one side of said energy source being connected to said motor, a pair of contacts carried by said housing, and parallel circuits connecting the other side of said energy source to said contacts.

5. A sound producing unit as claimed in claim 4, wherein said conductive portion of said frame is normally engaged with one of said contacts and normally disengaged with the other of said contacts, said other of said contacts disposed for engagement by said conductive portion when said sound generating means is moved toward said other of said sounding boards.

6. A sound producing unit as claimed in claim 5, wherein the one of said parallel circuits connected to said normally engaged contact includes a rheostat.

7. A sound producing unit as claimed in claim 4, said sound generating means further including a motor shaft extending from said motor, a rotatable plate secured to said motor shaft and having a plurality of lobes spaced about the periphery thereof, at least one pin affixed to said plate and extending perpendicularly therefrom, and a washer loosely mounted about each of said pins, the number of lobes on said plate being substantially greater than the number of washers.

8. A sound producing unit as claimed in claim 4, wherein said frame is pivoted to said housing through said mounting means, said control means including a push rod slideably mounted with respect to said housing and cooperatively engaged with said frame for rotating said frame against the action of said biasing means.

References Cited

UNITED STATES PATENTS

| 3,080,678 | 3/1963 | Girz | 46—232 |
| 3,160,984 | 12/1964 | Ryan | 46—232 |
| 3,190,034 | 6/1965 | Ryan | 46—232 X |

LOUIS G. MANCENE, *Primary Examiner.*

R. F. CUTTING, *Assistant Examiner.*